US008566190B2

(12) United States Patent
Noh

(10) Patent No.: US 8,566,190 B2
(45) Date of Patent: Oct. 22, 2013

(54) METHOD AND APPARATUS FOR EVALUATING AND MONITORING COLLATERALIZED DEBT OBLIGATIONS

(75) Inventor: Suok J. Noh, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 1917 days.

(21) Appl. No.: 10/359,484

(22) Filed: Feb. 6, 2003

(65) Prior Publication Data
US 2004/0158520 A1    Aug. 12, 2004

(51) Int. Cl.
*G06Q 40/00* (2012.01)
(52) U.S. Cl.
CPC ........................................ *G06Q 40/00* (2013.01)
USPC .......................................................... 705/35
(58) Field of Classification Search
None
See application file for complete search history.

(56) References Cited

U.S. PATENT DOCUMENTS

| | | | |
|---|---|---|---|
| 6,154,731 A | 11/2000 | Monks et al. | |
| 6,327,578 B1 * | 12/2001 | Linehan | 705/65 |
| 6,421,653 B1 | 7/2002 | May | |
| 6,456,982 B1 * | 9/2002 | Pilipovic | 705/36 R |
| 6,654,727 B2 * | 11/2003 | Tilton | 705/36 R |
| 7,313,541 B2 * | 12/2007 | Wise et al. | 705/36 R |
| 7,340,430 B2 * | 3/2008 | Mulinder et al. | 705/37 |
| 7,395,232 B1 * | 7/2008 | Pilato | 705/35 |
| 2002/0055897 A1 * | 5/2002 | Shidler et al. | 705/35 |
| 2002/0138299 A1 * | 9/2002 | Nations | 705/1 |
| 2003/0018570 A1 * | 1/2003 | McCabe et al. | 705/37 |
| 2003/0083972 A1 * | 5/2003 | Williams | 705/36 |
| 2003/0083978 A1 * | 5/2003 | Brouwer | 705/37 |
| 2003/0093347 A1 * | 5/2003 | Gray | 705/35 |
| 2003/0115125 A1 * | 6/2003 | Lee et al. | 705/36 |
| 2003/0120568 A1 * | 6/2003 | Chacko et al. | 705/35 |
| 2004/0117286 A1 * | 6/2004 | Charnley, Jr. | 705/36 |
| 2004/0143528 A1 * | 7/2004 | Spieler et al. | 705/35 |
| 2004/0167812 A1 * | 8/2004 | Haney, II | 705/8 |
| 2004/0225598 A1 * | 11/2004 | Goldberg et al. | 705/38 |
| 2005/0108139 A1 * | 5/2005 | Sperandeo | 705/36 |
| 2005/0262013 A1 * | 11/2005 | Guthner et al. | 705/38 |

OTHER PUBLICATIONS

"PCT Written Opinion of the International Searching Authority", mailed Nov. 10, 2005, for PCT/US2004/002880, 5 pgs.

* cited by examiner

*Primary Examiner* — Bruce I Ebersman
(74) *Attorney, Agent, or Firm* — Perkins Coie LLP

(57) ABSTRACT

Systems, methods, apparatus, computer program code and means for evaluating and monitoring collateralized debt obligations (CDOs) are provided which include identifying a first investment including interests in a first plurality of assets, identifying a second investment including interests in a second plurality of assets, identifying a common feature associated with both the first and second plurality of assets, and identifying a relative exposure to risk associated with the common feature.

14 Claims, 16 Drawing Sheets

| INVESTOR IDENTIFIER 302 | CDO IDENTIFIER / TRANCHE 304 | CDO IDENTIFIER / TRANCHE 306 | CDO IDENTIFIER / TRANCHE 308 |
|---|---|---|---|
| I-1001 | CDO-0001, Tranche A | CDO-0002, Tranche A | CDO-0010, Tranche C |
| I-1002 | CDO-0010, Tranche A | CDO-0002, Tranche B | ---- |
| I-1003 | CDO-0001, Tranche C | CDO-0020, Tranche C | CDO-0023, Tranche D |

FIG. 7

| CDO IDENTIFIER 402 | TRANCHE 404 | DESCRIPTION 406 | CUSIP 408 | RATINGS 410 | | | Scenario 412 | Settlement Date 414 | Coll. Date 416 | Pricing Info 418 |
|---|---|---|---|---|---|---|---|---|---|---|
| | | | | S&P | Moody | Fitch | | | | |
| CDO-0001 | A | LIBOR_6M+55 | 38143AA0 | AAA | Aaa | NA | Pricing | 03/01/02 | 01/15/02 | $266,383K; 2.48; 100.00; ... |
| | B | LIBOR_6M+150 | 38143AAB | A- | A3 | NA | Pricing | 03/01/02 | 01/15/02 | $40M; 3.43; 100.00; ... |
| | C | LIBOR_6M+225 | 38143AAC | NA | Baa2 | NA | Pricing | 03/01/02 | 01/15/02 | $16M; 4.18; 100.00; ... |
| | D | FIXED | 38143AAD | NA | Ba3 | NA | Pricing | 03/01/02 | 01/15/02 | $28M; 12.54; 100.00; ... |
| CDO-0002 | A | | | | | | | | | |
| | B | | | | | | | | | |
| | C | | | | | | | | | |
| CDO-0003 | A | | | | | | | | | |

FIG. 8

| CDO IDENTIFIER 502 | TRANCHE 504 | ASSET DESCRIPTION 506 | ISSUER 508 | ASSET CUSIP 510 | COUPON 512 | MATURITY 514 | ORIG BAL 516 | TYPE 518 | STATUS 520 | INDUSTRY 522 | ... |
|---|---|---|---|---|---|---|---|---|---|---|---|
| | A | XO Communications Inc.-10.75%; 6/2009 | XO Communications Inc. | 65333HAK9 | 10.75 | 06/01/2009 | 3M | Bond | Default | Telecommunications | ... |
| CDO-0001 | A | Zilog Inc.-9.5%; 3/2005 | Zilog Inc | 989524AB9 | 9.50 | 03/01/2005 | 3M | Bond | Default | Electronics | ... |
| | A | Global Crossing Hldgs Ltd-9.125%; 11/2006 | Global Crossing Hldgs Ltd | 37931KAGS | 9.12 | 11/15/2006 | 1M | Bond | Performing | Telecommunications | ... |
| | A | Global Crossing Hldgs Ltd-9.50%; 11/2009 | Global Crossing Hldgs Ltd | 37931KAJD | 9.50 | 11/15/2009 | 1.75M | Bond | Performing | Telecommunications | ... |
| ... | | | | ... | | | | | ... | | |

File  Options  Scenario  Pricing  Solver  Export  View  Utilities

| Deals: | Deal 1 | Deal 2 | Deal 3 | Deal 4 |

DEAL INFORMATION — *1012*

| Price | Deal | Tranche | CUSIP | S+P | Mdy | Scenario | Sett Dt | Balance | Coupon | | Price | Yield | Disc. Mrg | WAL | Mod On | Wind. Start | Wind. End | Orig. Bal | |
|---|---|---|---|---|---|---|---|---|---|---|---|---|---|---|---|---|---|---|---|
| 🐞 | Deal 1 | A | 38143MAA5 | AAA | Aaa | Pricing | 08/07/03 | 200,000.00 0 | 7.141 | | 100 | 5.437 | 43.685 | 7.070 | 5.794 | 5/23/06 | 1/23/09 | 200,000.00 0 | ... |
| 🐞 | Deal 2 | A | 38143GAA0 | AAA | Aaa | Pricing | 08/07/03 | 272,978.68 6 | 4.426 | | 100 | 5.548 | 54.820 | 6.778 | 5.600 | 1/10/05 | 7/10/09 | 276,000.00 0 | ... |
| 🐞 | Deal 3 | A | 37733PAA8 | AAA | Aaa | Pricing | 08/07/03 | 276,000.00 0 | 7.160 | | 100 | 5.427 | 42.666 | 6.864 | 5.612 | 11/9/05 | 5/9/11 | 276,000.00 0 | ... |

*1014*

| Portfolio by Issuer | Moodys Portfolio (%) | S+P Portfolio (%) | Moodys Portfolio ($MM) | S+P Portfolio ($MM) | | | | | | | | | | | | | | | |
|---|---|---|---|---|---|---|---|---|---|---|---|---|---|---|---|---|---|---|---|
| Issuer | | | | Balance $ | | | | | | | | | | | | | % | | |
| 360 Networks Inc. | | | | $62,730,000 | | | | | | | | | | | | | 0.13 | | |
| 7-Eleven, Inc. | | | | $7,400,000 | | | | | | | | | | | | | 0.02 | | |
| Accuride | | | | $84,000,000 | | | | | | | | | | | | | 0.17 | | |
| Ackerley Group Inc. | | | | $3,000,000 | | | | | | | | | | | | | 0.01 | | |
| Actuant Finance Corp. | | | | $20,775,000 | | | | | | | | | | | | | 0.04 | | |
| Adams Outdoor Advertising Limited Partnership | | | | $11,000,000 | | | | | | | | | | | | | 0.02 | | |
| AES Corporation (The) | | | | $634,400,000 | | | | | | | | | | | | | 1.32 | | |

*1016*

| Scenario | | Asset Level | | Reinvestment | | Test Scores | | CF Summary | | | | | | | | | | | | | | | | | | |
|---|---|---|---|---|---|---|---|---|---|---|---|---|---|---|---|---|---|---|---|---|---|---|---|---|---|---|

| Scenario Name | Mthly | Bond (not in default) | | | Loan (not in default) | | | Bond (in default) | | | Loan (in default) | | | Bond (CCC or lower) | | | Loan (CCC or lower) | | |
|---|---|---|---|---|---|---|---|---|---|---|---|---|---|---|---|---|---|---|---|
| | | CDR | Rec | Lag | CDR | Rec | Lag | CPR | CDR | Rec | Lag | CPR | CDR | Rec | Lag | CPR | CDR | Rec | Lag | C |
| Pricing | 🐞 | 2 | 60 | 0 | 0 | 20 | 0 | 0 | 100 | 60 | 0 | 0 | 100 | 20 | 0 | 0 | 5 | 20 | 0 | 0 |
| Test | 🐞 | 2 | 50 | 0 | 2 | 50 | 0 | 2 | 100 | 50 | 0 | 2 | 100 | 50 | 0 | 2 | 2 | 50 | 0 | 2 |
| Bloomberg | 🐞 | 2 | 50 | 0 | 0 | 50 | 0 | 0 | 100 | 50 | 0 | 0 | 100 | 50 | 0 | 0 | 2 | 50 | 0 | 0 |

| Portfolio by Issuer | Portfolio by Asset | Moodys Portfolio (%) | S+P Portfolio (%) | Moodys Portfolio ($MM) | S+P Portfolio ($MM) | | | |
|---|---|---|---|---|---|---|---|---|
| Issuer | | In # Deals | Balance $ | % | Deal 1 | Deal 2 | Deal 3 | Deal 4 |
| Total | | -- | 13,231,835,681 | 100 | 425,886,141 | 396,251,825 | 979,873,729 | 508,594,456 |
| Nextel Communications Inc | | 25 | 191,533,615 | 1.45 | 6,500,000 | 4,800,000 | 10,000,000 | 6,000,000 |
| Allied Waste Industries Inc | | 26 | 184,160,962 | 1.39 | 5,200,678 | 2,000,000 | -- | 6,983,983 |
| Charter Communications Inc | | 25 | 157,403,236 | 1.19 | 6,500,000 | 7,000,000 | 5,000,000 | 7,000,000 |
| United Rentals Inc | | 25 | 145,243,750 | 1.10 | 3,993,750 | 3,000,000 | 5,500,000 | 6,000,000 |
| Adelphia Communications Corp | | 23 | 125,425,643 | 0.95 | 6,000,000 | 3,000,000 | 5,500,000 | 6,000,000 |
| Global Crossing Holdings Ltd | | 19 | 97,750,000 | 0.74 | 6,500,000 | 5,000,000 | 6,500,000 | 6,000,000 |
| Wyndham Intl | | 8 | 91,958,988 | 0.69 | -- | -- | -- | 6,400,000 |

FIG. 10C

| Portfolio by Issuer | Portfolio by Asset | Moodys Portfolio (%) | S+P Portfolio (%) | Moodys Portfolio ($MM) | S+P Portfolio ($MM) |
|---|---|---|---|---|---|
| | Asset | | | | Balance $ |
| | 360 Networks Inc. 13.000 05/01/2008 | | | | 62,730,000 | 0.13 |
| | 7-Eleven, Inc. 5.000 12/15/2003 | | | | 7,400,000 | 0.02 |
| | Accuride 9.250 02/01/2008 | | | | 84,000,000 | 0.17 |
| | Ackerley Group Inc 9.000 01/15/2009 | | | | 3,000,000 | 0.01 |
| | Actuant Finance Corp 13.000 05/01/2009 | | | | 20,775,000 | 0.04 |
| | Adams Outdoor Advertising Limited Partnership 10.750 03/15/2006 | | | | 11,000,000 | 0.02 |
| | AES Corporation (The) 10.250 07/15/2006 | | | | 27,000,000 | 0.06 |

| Portfolio by Issuer | Portfolio by Asset | Moodys Portfolio (%) | S+P Portfolio (%) | Moodys Portfolio (%) | S+P Portfolio (%) | Moodys Portfolio ($MM) | S+P Portfolio ($MM) | | | Total |
|---|---|---|---|---|---|---|---|---|---|---|
| Industry | Industry Name | Aaa-Baaa3 | Aaa-Baa3 | Ba1 | Ba1 | Ba2 | Ba3 | B1 | ... | Total |
| 1 | Aerospace and Defense | -- | -- | 0.04% | | 0.27% | 0.41% | 0.25% | ... | 1.93% |
| 2 | Automobile | -- | -- | 0.46% | | 0.13% | 0.37% | 0.80% | ... | 4.25% |
| 3 | Banking | 0.10% | | 0.13% | | -- | 0.39% | -- | ... | 0.79% |
| 4 | Beverage, Food & Tobacco | 0.36% | | -- | | 0.10% | 0.22% | 0.60% | ... | 2.06% |
| 5 | Buildings and Real Estate | 0.21% | | 0.62% | | 0.60% | 1.32% | 1.07% | ... | 5.99% |
| 6 | Chemicals, Plastics & Rubber | -- | | 0.52% | | 0.30% | 1.71% | 0.43% | ... | 4.89% |

| Portfolio by Issuer | Portfolio by Asset | Moodys Portfolio (%) | S+P Portfolio (%) | Moodys Portfolio (%) | S+P Portfolio (%) | Moodys Portfolio ($MM) | S+P Portfolio ($MM) | | | Total |
|---|---|---|---|---|---|---|---|---|---|---|
| Industry | Industry Name | Aaa-Baa3 | Aaa-Baa3 | Ba1 | Ba1 | Ba2 | Ba3 | B1 | ... | Total |
| 1 | Aerospace and Defense | -- | -- | 2.0 | | 13.75 | 20.31 | 12.52 | ... | 96.64 |
| 2 | Automobile | -- | -- | 23.08 | | 6.46 | 18.36 | 40.26 | ... | 213.09 |
| 3 | Banking | 5.25 | | 6.28 | | -- | 19.41 | -- | ... | 39.36 |
| 4 | Beverage, Food & Tobacco | 17.94 | | -- | | 4.99 | 11.25 | 30.09 | ... | 103.13 |
| 5 | Buildings and Real Estate | 10.50 | | 30.92 | | 29.88 | 65.88 | 53.59 | ... | 299.78 |
| 6 | Chemicals, Plastics & Rubber | -- | | 26.13 | | 15.16 | 85.62 | 21.53 | ... | 244.83 |

FIG. 10F

| Portfolio by Issuer | Portfolio by Asset | Moodys Portfolio (%) | S+P Portfolio (%) | Moodys Portfolio ($MM) | | S+P Portfolio ($MM) | | | |
|---|---|---|---|---|---|---|---|---|---|
| Industry | Industry Name | Aaa-Baa3 | Ba1 | Ba2 | Ba3 | | B1 | | Total |
| 1 | Aerospace and Defense | -- | 2.0 | 13.75 | 20.31 | | 12.52 | ... | 96.64 |
| 2 | Automobile | -- | 23.08 | 6.46 | 18.36 | | 40.26 | ... | 213.09 |
| 3 | Banking | 5.25 | 6.28 | -- | 19.41 | | -- | ... | 39.36 |
| 4 | Beverage, Food & Tobacco | 17.94 | -- | 4.99 | 11.25 | | 30.09 | ... | 103.13 |
| 5 | Buildings and Real Estate | 10.50 | 30.92 | 29.88 | 65.88 | | 53.59 | ... | 299.78 |
| 6 | Chemicals, Plastics & Rubber | -- | 26.13 | 15.16 | 85.62 | | 21.53 | ... | 244.83 |

FIG. 10G

| Scenario | Asset Level | Reinvestment | Test Scores | CF Summary | | | | | | | | | | | |
|---|---|---|---|---|---|---|---|---|---|---|---|---|---|---|---|
| Override | Cashflows | ID | Description | Coupon | Maturity | Cusip | Orig Bal | Type | Status | Industry | Ind | S+P | Mdy | CPR | CDR |
| ☐ | ☐ | A001 | 360Networks Inc -13% 05/2008 | 13.00 | 20080501 | 88575tal0 | 490,000 | Bond | Default | Telecom | 29 | D | Ca | 0 | 0 |
| ☐ | ☐ | A002 | 360Networks Inc. -Term Loan B-1 | 9.00 | 20071231 | NA | 7,500,000 | Loan | Default | NA | 0 | D | Caa2 | 0 | 0 |
| ☐ | ☐ | A003 | PSINet Inc -10% 02/2005 | 10.00 | 20050215 | 74437cab7 | 750,000 | Bond | Default | Telecom | 29 | D | Ca | 0 | 0 |
| ☐ | ☐ | A004 | Orius Corp - 12.75% 2/2010 | 12.75 | 20100201 | 62874lac0 | 1,250,000 | Bond | Perf. | Telecom | 29 | B- | Caa2 | 0 | 0 |

| Issuer Diversity | Industry Diversity | Test Scores | | Moodys Portfolio (%) | | S+P Portfolio (%) | History | Definition | Collateral Summary | Impact |
|---|---|---|---|---|---|---|---|---|---|---|
| | | Test | | Target | Actual | Pass/Fail | | | | |
| | | DEBT_RATING_TEST | | 2625.000 | 2725.000 | Fail | | N/A | | N/A |
| | | A_PAR_TEST | | 1.173 | 1.306 | Pass | | The Class A Par Value Test is satisfied when the Class A Par Value Ratio is... | | Excess int & principal will be used to accelerate Class A until such... |
| | | A_INT_COV_TEST | | 1.500 | 1.814 | Pass | | The Class A Interest Coverage Test is satisfied when the Class A interest... | | Excess int & principal will be used to accelerate Class A until such... |
| | | B_PAR_TEST | | 1.097 | 1.156 | Pass | | The Class B Par Value Test is satisfied when the Class B Par Value Ratio is... | | Excess int & principal will be used to accelerate Classes A and B until... |

FIG. 10J — 1032

| Scenario | Asset Level | Reinvestment | Test Scores | CF Summary | | | | | | | |
|---|---|---|---|---|---|---|---|---|---|---|---|
| Period | Valid To | Bond Coupon | Bond Maturity | Bond % | Loan Spread | Loan Maturity | Loan Price | Loan % | Index | Spread | Use CDI |
| 0 | 02/01/2012 | 10.000 | 02/01/2012 | 0.000 | 3.130 | 02/01/2012 | 100 | 100 | 0 | 500 | ✓ |

1034

| Scenario | Asset Level | | Reinvestment | | Test Scores | | CF Summary | A | B | C | D |
|---|---|---|---|---|---|---|---|---|---|---|---|
| | A_INT_COV_TEST | | | | B_INT_COV_TEST | | | A_PAR_TEST | | | |
| Date | Target | Actual | Pass/Fail | | Target | Actual | Pass/Fail | Target | Actual | Pass/Fail | |
| 6/12/2003 | 1.300 | 2.112 | Pass | | 1.150 | 1.864 | Pass | 1.150 | 1.316 | Pass | |
| 7/12/2003 | 1.300 | 2.112 | Pass | | 1.150 | 1.864 | Pass | 1.150 | 1.316 | Pass | |
| 8/12/2003 | 1.300 | 2.039 | Pass | | 1.150 | 1.799 | Pass | 1.150 | 1.314 | Pass | |
| 9/12/2003 | 1.300 | 1.955 | Pass | | 1.150 | 1.725 | Pass | 1.150 | 1.312 | Pass | |

| B_PAR_TEST | | | C_INT_COV_TEST | |
|---|---|---|---|---|
| Target | Actual | Pass/Fail | Target | Actual |
| 1.070 | 1.175 | Pass | 1.080 | 1.772 |
| 1.070 | 1.175 | Pass | 1.080 | 1.772 |
| 1.070 | 1.171 | Pass | 1.080 | 1.711 |
| 1.070 | 1.171 | Pass | 1.080 | 1.641 |

Active Deal: Deal 1 — CDU Determination Date: 08/05/2003

| Scenario | Asset Level | | Reinvestment | | Test Scores | | CF Summary | A | B | C | D |
|---|---|---|---|---|---|---|---|---|---|---|---|
| Period | Date | Balance | Interest | Principal | Surplus | Total CF | Sch Prin | Unsch Prin | Acc Prin | Accd Prin | |
| 0 | 6/12/2003 | 373,500,000 | 0.000 | 0.000 | 0.000 | 0.000 | 0.000 | 0.000 | 0.000 | 0.000 | |
| 1 | 7/12/2003 | 373,500,000 | 0.000 | 0.000 | 0.000 | 0.000 | 0.000 | 0.000 | 0.000 | 0.000 | |
| 2 | 8/12/2003 | 373,500,000 | 0.000 | 0.000 | 0.000 | 0.000 | 0.000 | 0.000 | 0.000 | 0.000 | |
| 3 | 9/12/2003 | 373,500,000 | 4,247,525 | 0.000 | 0.000 | 4,247,525 | 0.000 | 0.000 | 0.000 | 0.000 | |

| Post Int Balance | Pre Int Balance |
|---|---|
| 373,500,000 | 0.000 |
| 373,500,000 | 373,500,000 |
| 373,500,000 | 373,500,000 |
| 373,500,000 | 373,500,000 |

Active Deal: Deal 1 — CDU Determination Date: 08/05/2003

FIG. 10L

METHOD AND APPARATUS FOR EVALUATING AND MONITORING COLLATERALIZED DEBT OBLIGATIONS

FIELD OF THE INVENTION

The present invention relates to methods and apparatus for evaluating and monitoring collateralized debt obligations.

BACKGROUND OF THE INVENTION

Collateralized debt obligations ("CDOs") are financial arrangements which have become quite popular in recent years. Generally, a CDO is a special purpose investment vehicle which is established to securitize assets such as corporate bonds, corporate loans or the like. In general, a CDO is created by a party (generally referred to as the "issuer") to hold a pool of underlying collateral or assets. The issuer then issues securities backed by the underlying collateral pool.

The cash flows generated by the underlying collateral are used to pay interest and principal on the issued securities. Each of the underlying assets have credit risk associated with them (e.g., including default and prepayment risk). The well diversified pool of assets provides additional credit enhancement to the securities issued by the CDO. Credit enhancement is further created by "tranching" the CDO (e.g., the total pool of assets may be segmented into pools by taking the underlying asset cash flows and dividing them among multiple tranches) creating different risk profiles associated with each tranche of the CDO. In this manner, securities are created which satisfy the risk and reward desires of different investors.

Investors invest in the CDO by contracting with the issuer to buy interests in one or more tranches. An investor may receive periodic interest and principal payments on the securities. A typical CDO investor may hold multiple tranches from one or more issuers.

Reference is now made to FIG. 1, where a simplified example of a typical CDO investment structure 10 is depicted. In the depicted structure 10, two issuers 12, 14 have each established a CDO (items 16, 26 respectively). Each CDO 16, 26 is structured to have multiple tranches 18, 20 and 28, 30 which hold interests in a pool of assets or collateral items. For example, the "ABC CDO" holds a number of underlying assets, including loans and bonds. The two depicted tranches of the "ABC CDO" may be structured to provide different risks based on the underlying assets (e.g., the "A" tranche may be formed based on senior secured bank loans and/or senior secured bonds).

In the depicted example structure, two investors 22, 24 have contracted with issuers 12, 14 to purchase securities offered by the issuers. Investor 22 has purchased the securities identified as "Tranche A" of "ABC CDO" from issuer 12, and has also purchased the securities identified as "Tranche A" of "XYZ CDO" from issuer 14. Investor 24 has purchased securities identified as "Tranche N" of "ABC CDO". This represents a typical occurrence in CDO investing: a CDO investor often acquires multiple interests in CDOs, often from different issuers (or even from the same issuer). In the example depicted, this can lead to an investor (such as investor 22) holding interests in the same item of collateral through different investments. As depicted, investor 22 is exposed to credit or default risk if the asset identified as "Loan 1" defaults ("Loan 1" is included in the A Tranche of both ABC CDO and XYZ CDO). Currently, it is difficult for CDO investors to identify such multiple exposures.

Because CDO investments often include large numbers of underlying assets, it can be difficult for a CDO investor to manage and identify risks associated with these assets. Each of these assets exposes the investor to risks of default or pre-payment. These risks can be evaluated based on a better understanding of each of the assets, industry areas, and issuers.

It would be desirable to provide CDO investors with the ability to access information about the asset and issuer and exposure across multiple deals in a timely fashion. It would further be desirable to provide CDO investors with an ability to perform risk management of their investments, including an ability to aggregate exposures across different deals. It would further be desirable to provide CDO investors with an ability to perform modeling of various default and prepayment scenarios to evaluate their impact across the CDO investor's current (or desired) portfolio of deals. It would further be desirable to address deficiencies in existing CDO evaluation and monitoring tools.

SUMMARY OF THE INVENTION

To alleviate the problems inherent in the prior art, embodiments of the present invention provide systems, methods, apparatus, computer program code and means for evaluating and monitoring collaterized debt obligations (CDOs).

In some embodiments, a method, system, apparatus, computer program code and means for managing investments is provided which includes identifying a first investment including interests in a first plurality of assets, identifying a second investment including interests in a second plurality of assets, identifying a common feature associated with both the first and second plurality of assets, and identifying a relative exposure to risk associated with the common feature.

In some embodiments, the common feature is at least one of a common asset, a common industry, and a common issuer of assets. In some embodiments, where the common feature is a common issuer of assets, embodiments further include modeling a default associated with the common issuer, and calculating an impact on the first and said second investments based on the default. In some embodiments, both the first and second investments are collateralized debt obligation (CDO) investments, and the common asset is at least one of a debt security and a corporate loan.

In some embodiments, each of said first and second plurality of assets are identified by at least one of a CUSIP number and an asset descriptor.

In some embodiments, a method, system, apparatus, computer program code and means are provided which include receiving information identifying an investor and a first and a second CDO investment held by the investor, identifying a first plurality of assets associated with the first CDO investment, identifying a second plurality of assets associated with the second CDO investment, identifying each of the first and second plurality of assets using a standardized asset description; and identifying a common asset associated with the first and second CDO investments.

According to some embodiments, embodiments further include modeling a default associated with the common asset, and calculating an impact on the first and said second CDO investments based on the default.

In some embodiments, a method, system, apparatus, computer program code and means are provided which include receiving information identifying an investor and a CDO investment held by the investor, identifying a first plurality of assets associated with the CDO investment, receiving information identifying a desired CDO investment, including a second plurality of assets associated with the desired CDO investment, and identifying a common asset associated with the desired CDO investment and the CDO investment. Some embodiments further include assessing an overall exposure associated with the desired CDO investment and the CDO investment attributed to the common asset.

In some embodiments, a method, system, apparatus, computer program code and means for monitoring a CDO portfolio include entering information identifying a first and a second CDO investment, entering pricing assumption data, and modeling an impact on the first and second CDO investments based on the pricing assumption data. In some embodiments the pricing assumption data includes data identifying at least one of: a default rate assumption, a recovery rate assumption, a recovery lag assumption, and a prepayment rate assumption.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 7 is a table depicting a representative investor database for use in the system of FIG. 2 pursuant to some embodiments of the present invention.

FIG. 8 is a table depicting a representative CDO database for use in the system of FIG. 2 pursuant to some embodiments of the present invention.

FIG. 9 is a table depicting a representative asset database for use in the system of FIG. 2 pursuant to some embodiments of the present invention.

DETAILED DESCRIPTION OF THE INVENTION

Figure 1:
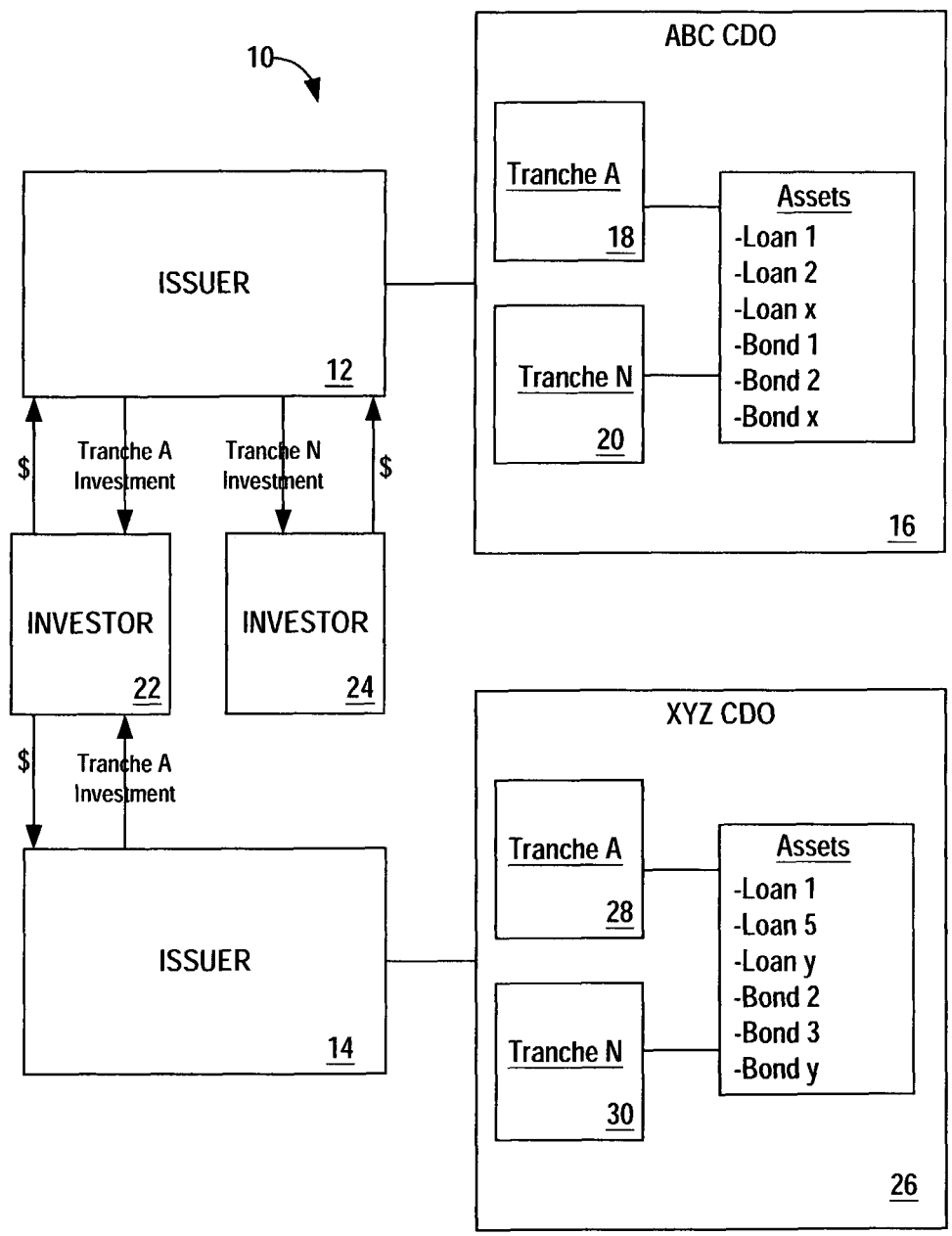
FIG. 1 is a block diagram depicting a typical CDO structure which may be supported using some embodiments of the present invention.

Applicants have recognized that there is a need for a system, method, apparatus, computer program code, and means for evaluating and monitoring CDOs. For example, embodiments allow a CDO investor (or potential investor) to interact with a CDO management system to evaluate the investor's current or prospective CDO investments (e.g., to identify areas of over-exposure to individual assets, to price various scenarios, etc.). CDO investors may also utilize features of embodiments to manage existing portfolios.

For clarity, a number of terms are used herein to describe features of some embodiments of the present invention. For example, as used herein, the term "CDO" means a debt or equity security collateralized by debt obligations. The debt obligations may include, for example, commercial loans, commercial bonds, mortgages, or the like. As used herein, the term "CDO" is used to generally refer to a structured finance transaction in which one or more tranches of debt or equity securities are issued by a special purpose vehicle ("SPV") established having assets consisting of the debt obligations. A CDO may hold a number of assets selected to provide diversification of the securities issued by the SPV. A CDO may include a number of tranches which are established to provide further diversification and to provide a single risk-return profile. Details of the structuring and administration of CDOs are described in "Investing in Collateralized Debt Obligations", Frank J., Ph.D. Fabozzi et al. (Eds.), John Wiley & Sons, 1st edition (May 2001), the contents of which are incorporated herein by reference in their entirety for all purposes.

As used herein, the term "investor" is used to refer to an individual or entity which contracts with a CDO issuer or administrator to acquire debt or equity securities issued by the CDO.

As used herein, the term "asset" is used to refer to an obligation held by a CDO as collateral for securities issued by the CDO. An "asset" may be, for example, a bond, a loan, a mortgage, or other assets held by a CDO. In general, an asset held by a CDO may be identified by an asset name, a securities identifier (such as a "CUSIP number" used to refer to securities identifiers which conform to rules promulgated by the Committee on Uniform Securities Identification Procedures or a "ISIN" used to refer to international securities identification numbers), or the like. Each asset is associated with an "issuer" of the asset. For illustrative purposes, a CDO which holds a number of commercial bonds may hold a commercial bond referred to as "Adelphia Communication— 9.375%, November 2009" which is issued by "Adelphia Communication" (referring to a commercial bond having a coupon of 9.375% and having a maturity date of November 2009). The commercial bond may also be referred to by its ISIN (in the example, the ISIN for the bond is US006848BE48). As used herein, each "issuer" of an "asset" held by a CDO may be identified by a number of items of information, including, for example, by its name, industry code, or the like.

As used herein, each investor may hold one or more interests in CDOs. Each CDO investment held by an investor may be referred to herein as a particular "deal" associated with the investor. If an investor has several CDO interests (several "deals"), the total set of interests will generally be referred to herein as the investor's "portfolio". As will be described further herein, embodiments allow investors to analyze and manage existing their existing portfolios. Embodiments further allow investors to analyze and manage potential CDO investments (e.g., to evaluate the impacts of adding further CDO investments—or "deals"—to their current portfolio). As used herein, an investor's potential portfolio is referred to as the investor's "hypothetical portfolio". A "hypothetical portfolio" may include one or more current CDO investments held by the investor (i.e., the investor's "portfolio") as well as one or more potential CDO investments. Embodiments allow CDO investors to analyze and manage their existing portfolios as well as their hypothetical portfolios (e.g., to aid the CDO investor in selecting available CDO investments which achieve an overall portfolio having desired characteristics).

Introductory Example

Prior to a detailed description of various features, an illustrative example of some features of embodiments of the present invention will first be set forth. This example is not intended to be limiting. In the example, a CDO investor holds securities issued by two different CDO issuers (e.g., the investor has securities from the "Tranche A" of "ABC CDO" and "Tranche B" of the "XYZ CDO" depicted in FIG. 1). Each tranche includes a large number of assets issued by a large number of issuers. The investor first wishes to monitor and evaluate its holdings (its current "portfolio") and operates a computing device to access a CDO management system configured pursuant to embodiments of the present invention. In accessing the CDO management system, the investor may be required to identify itself and identify the two CDOs (and tranches) in which it holds a position. In some embodiments, details regarding the investor's current portfolio are previously stored by the CDO management system. For example, the investor may simply identify itself to a CDO management system and the two current deals associated with the investor will automatically be identified by the CDO management system.

The investor may then direct the CDO management system to identify all features which are common to both the "ABC CDO" and the "XYZ CDO" tranches that it holds. For example, the system may determine that a large amount of WorldCom, Inc. corporate loans are held in both CDO tranches (i.e., the investor may request that the CDO management system identify common assets or common issuers between the two CDOs). Prior to the introduction of the present invention, it was difficult for CDO investors to readily identify such holdings across different CDO investments. The investor may be concerned that its current portfolio, which includes multiple holdings in WorldCom, Inc. corporate loans, presents undue credit risks and may determine that some corrective action should be taken (e.g., by changing its position or by further diversifying its holdings by taking positions in CDOs which do not include WorldCom, Inc. corporate loans, etc.).

As a second example, the investor may interact with the CDO management system to analyze whether a "hypothetical portfolio" of CDO investments is desirable. In this example, the investor may interact with the CDO management system to identify one or more CDO investments (which may include current CDO investments held by the investor, or it may include potential CDO investments to be evaluated by the investor). For example, the investor may not currently hold a position in either "ABC CDO" or "XYZ CDO", and may wish to evaluate whether an investment including tranches from both CDOs is desirable. After identifying tranches of both CDOs, the investor may interact with the CDO management system to perform one or more pricing analyses. The investor may also interact with the CDO management system to identify non-performing bonds or loans in default. The investor may further interact with the CDO management system to identify common features included in the hypothetical portfolio (e.g., to identify the total exposure to assets or issuers of concern). In this manner, CDO investors are able to proactively evaluate and manage both existing and potential CDO investments.

System/Device Description

Figure 2:
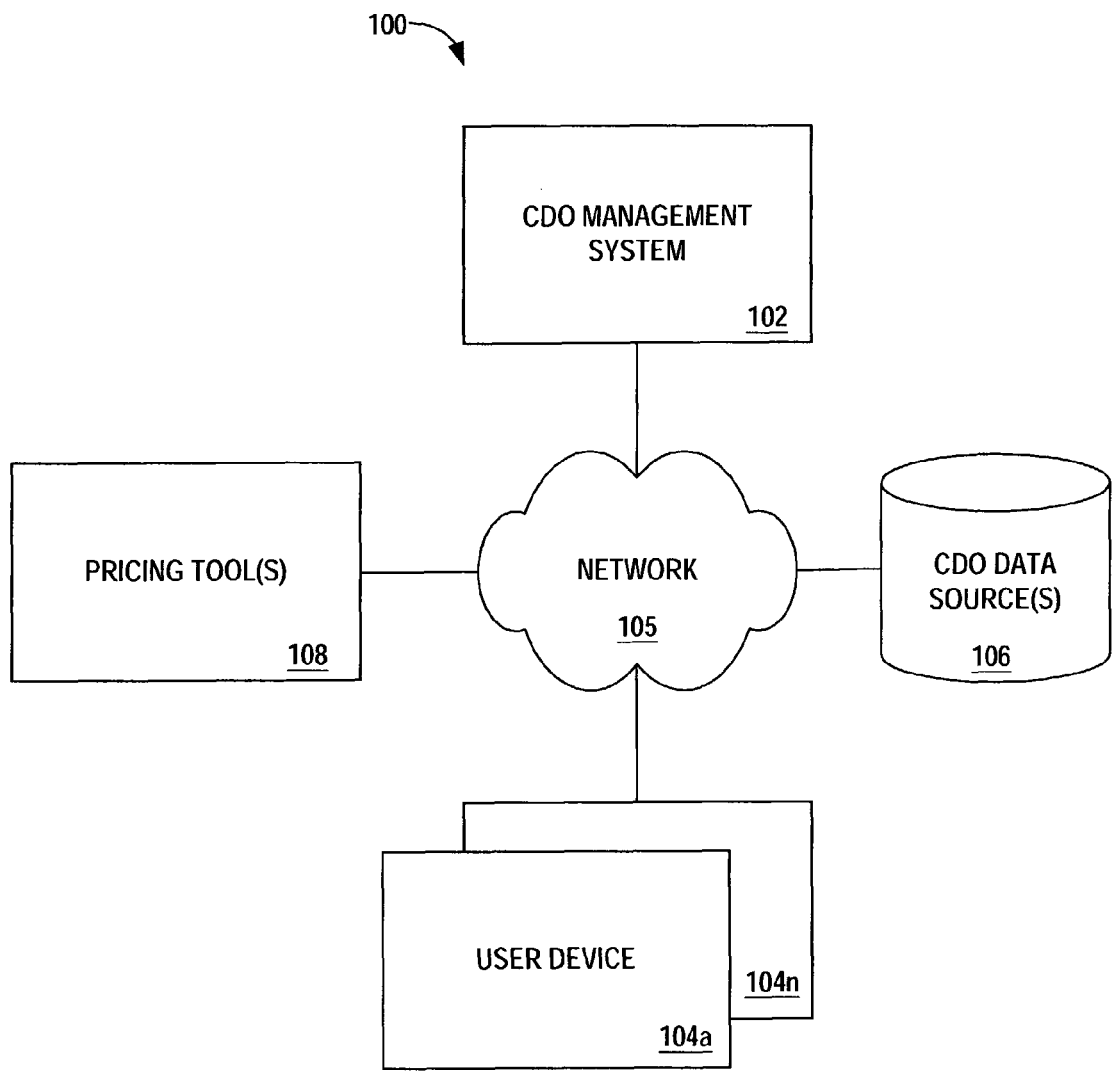
FIG. 2 is a block diagram depicting a system including a CDO management system pursuant to some embodiments of the present invention.

Features of some embodiments will now be described by reference to FIG. 2, where a system 100 is depicted. System 100 includes a number of devices in communication with each other via, for example, a network 105. As depicted, system 100 includes a CDO management system 102, a number of user devices 104, one or more CDO data sources 106 and one or more pricing tools 108. Some or all of the devices may be operated by or on behalf of different entities. For example, in some embodiments, CDO management system 102 is operated by or on behalf of a CDO service provider, such as, a broker, an underwriter, an issuer, or other entity which provides CDO management and analysis information to a number of users (e.g., such as CDO investors operating user devices 104). As will be described further below, CDO management system 102 may be configured as a network server or other device which may be accessed by one or more authorized users to perform CDO management and analysis using features of embodiments of the present invention.

Figure 3:
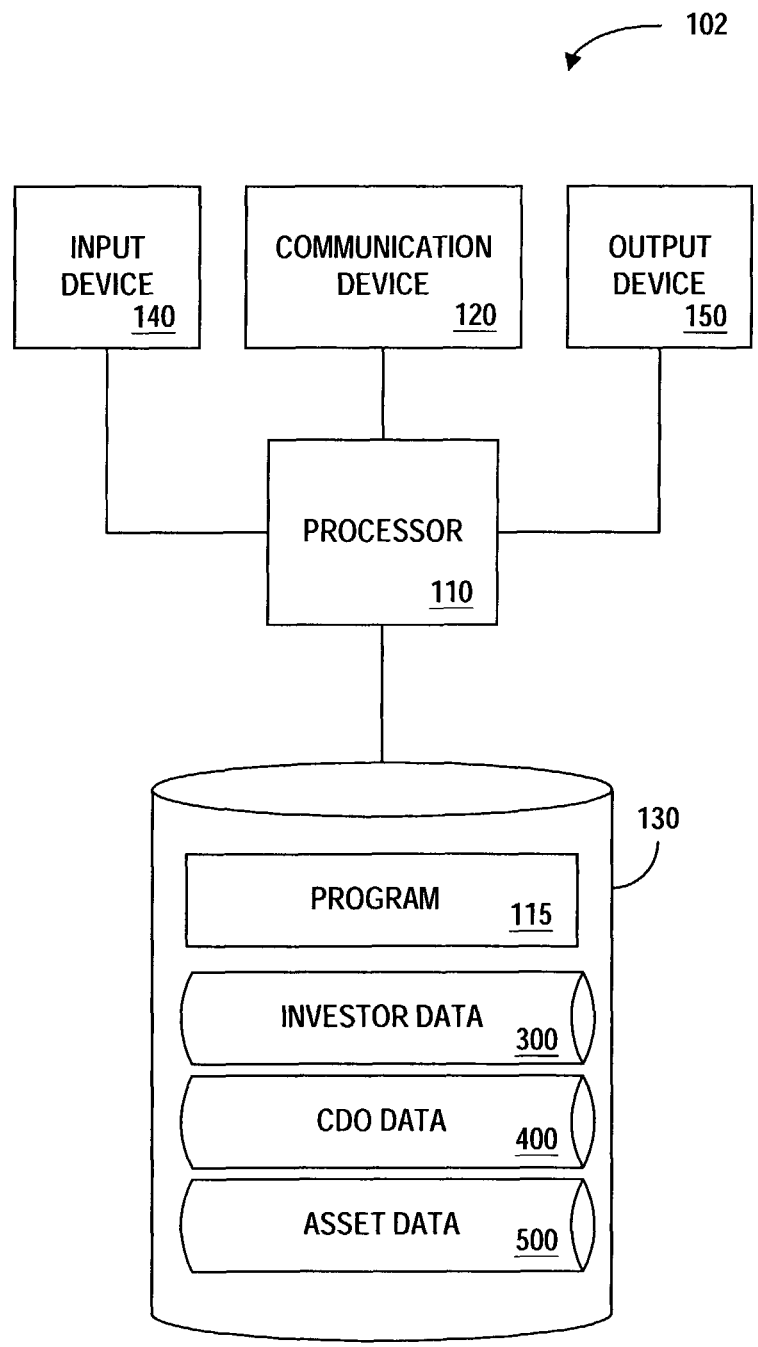
FIG. 3 is a block diagram of one embodiment of the CDO management system of FIG. 2.

User devices 104 may be computers or other devices configured to interact with CDO management system 102. For example, user devices 104 may be personal computers, laptops, PDAs, wired or wireless telephones, or other devices. Further details of a CDO management system 102 is shown at FIG. 3, described below. Similarly-configured devices may be used for other devices of the system of FIG. 2.

CDO data source(s) 106 may be data sources operated or provided by service providers which generate CDO data, such as, for example, the data sources provided by Standard & Poors® (a division of McGraw-Hill, Inc.), Moodys Investor Services®, Fitch, or the like. Data provided by data sources 106 may be utilized to populate one or more databases utilized by CDO management system 102. For example, CDO data from data sources 106 may be used to develop a CDO database which identifies current assets, issuers, and other information associated with individual CDOs. CDO data from data sources 106 may also include rating, risk and pricing data regarding individual assets, issuers and CDOs. For example, rating data may be retrieved from various sources (e.g., indicating an overall rating associated with a particular asset as provided by a rating agency such as Standard & Poors). Similarly, rating data may be retrieved for individual CDO deals or tranches. Data from CDO data source(s) 106 may be retrieved on a regular basis or as needed. This data may be retrieved electronically (e.g., via the Internet), by physically entering the data into CDO management system 102, or using other means.

Pricing tools 108 may include CDO pricing tools provided by service providers which price CDOs. For example, pricing tools 108 may include CDO pricing tools such as: the high yield bond pricing tools provided by the Electronic Joint Venture (EJV), loan pricing information provided by the Loan Pricing Corporation, trading desk pricing information (e.g., such as those collected by the trading desks operated by the Goldman, Sachs Co.), pricing information provided by CDO collateral managers, credit risk assessment information provided by CreditGrades, rating update information provided by Standard & Poors, Moodys Investor Services or the like, risk information provided by KMV (operated by Moodys Investor Services) or PACE, and other sources of pricing, risk, or other information.

In some embodiments, system 100 may be configured as a computer-based system. For example, in some embodiments, CDO management sytsem 102 may be configured as a computer server which may be accessed over network 105 by a number of users operating user devices 104a-n. In some embodiments, CDO management system 102 is configured as a Web server which may be accessed by user devices 104a-n via a network such as the Internet. Embodiments allow investors, or agents of investors, to interact with CDO management system 102 to manage and analyze CDO investments.

Any number of entities, devices, data sources or pricing tools (e.g., such as devices 102 or 104) may be provided in system 100. Communication between devices 102-104, data sources 106 and pricing tools 108 may be direct or indirect, such as over the Internet through a Web site maintained by a remote server or over an on-line data network including commercial on-line service providers, bulletin board systems and the like. For example, in some embodiments, CDO management system 102 may be operated as a central service to facilitate the management and analysis of CDO investments for a large number of investors. In some embodiments, CDO management system 102 may be operated as a private or internal service to facilitate the management and analysis of CDO investments for client investors, for a small group of investors, or even for a single investor.

Any of a number of different types of networks or communications techniques may be used to facilitate communication between (and within) entities operating devices 102 and 104 (as well as pricing tools and data sources). For example, communication may be via a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communications" can refer to wired and/or wireless communications as appropriate. Note that the devices and entities communicating as shown in FIG. 2 need not be in constant communication.

Referring now to FIG. 3, some devices used in conjunction with the present invention (such as, for example, CDO management system 102) include one or more input devices 140, one or more communication devices 120, one or more output devices 150, one or more storage devices 130, all of which are in communication with one or more processing devices 110 to perform processing pursuant to embodiments of the present invention.

Communication device 120 may be used to facilitate communication with, for example, other devices (such as client devices 104, CDO data sources 106 and pricing tools 108). Input device 140 may comprise, for example, a keyboard, a keypad, a mouse or other pointing device, a microphone, knob or a switch, an infra-red (IR) port, a docking station, and/or a touch screen. Input device 140 may be used, for example, to enter information (e.g., information regarding CDO investors, CDO investments, individual assets, or the like). Output device 150 may comprise, for example, a display (e.g., a display screen), a speaker, and/or a printer.

Storage device 130 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 130 stores one or more programs 115 for controlling processor 110. Processor 110 performs instructions of program 115, and thereby operates in accordance with the present invention. In some embodiments, program 115 may generally be configured as a program using techniques known to those skilled in the art to achieve the functionality described herein. For example, program 115 may be coded to perform some or all of the steps of the processes or interfaces depicted herein (e.g., such as the processes described in conjunction with FIGS. 4-6 and/or the user interfaces described in conjunction with FIG. 10). As a more particular example, program 115 may be coded to allow clients to interact with CDO management system 102 to identify CDO investments, to identify assets, to price CDO scenarios, to manage existing portfolios, to evaluate hypothetical portfolios, etc.

Storage device 130 may also store one or more databases, including, for example, databases including information identifying CDO investors, CDOs, assets, or other databases necessary or useful in evaluating, pricing, managing, analyzing or otherwise maintaining CDO investments pursuant to embodiments of the present invention.

Process Description

Figure 4:
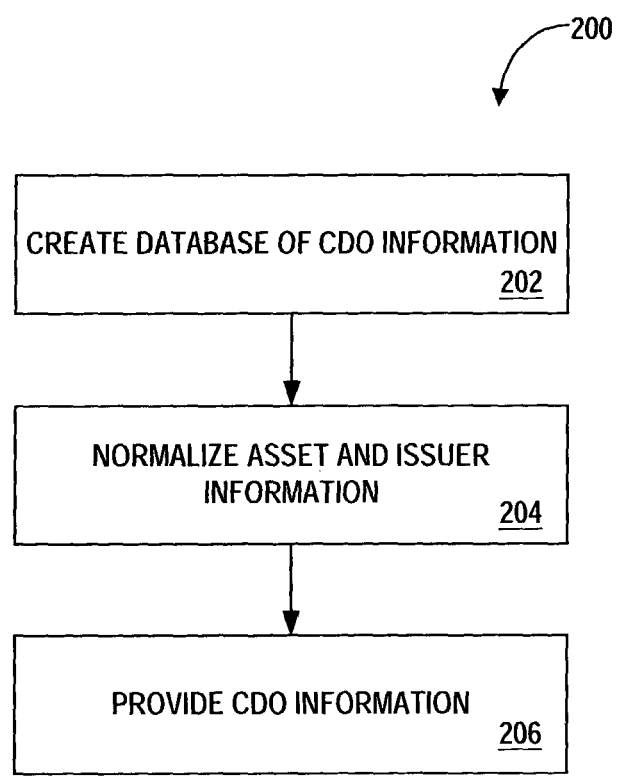
FIG. 4 is a flow diagram illustrating an exemplary process for storing and presenting CDO information pursuant to some embodiments of the present invention.

Various processes which may be implemented using CDO management system 102 will now be described. Reference is first made to FIG. 4, where a flow diagram 200 is shown. The individual process steps of flow diagram 200 (and other process steps described herein) are not intended to imply a specific set order; rather, those skilled in the art will appreciate that the process may be performed in any order practicable.

Process 200 begins at 202 where a database of CDO information is created. This database of CDO information may be stored at, or accessible to, CDO management system 102. This database may be continually updated to reflect current CDO information. For example, the database may be updated each time a new CDO issue is identified. As another example, the database may be updated each time a CDO investor is identified who wishes to utilize CDO management system (an example investor database is shown at FIG. 7 depicting exemplary information which may be stored for each investor utilizing CDO management system 102).

When a new CDO investor is identified, the CDO investor's CDO portfolio may be identified and information regarding the deals that are included in the portfolio may be included in the database created at 202. An example CDO database is shown at FIG. 8. As depicted in FIG. 8, CDO database 400 may include CDO data such as, for example, an identifier used to identify individual CDOs, tranche identifiers, CDO descriptions, other identifiers (such as CUSIPS or other data), ratings information, settlement information, collection information, pricing information, etc.

Information may also be stored identifying individual assets associated with each CDO investment. For example, referring briefly to FIG. 9, a database may be created which identifies individual assets held by each CDO. The CDO asset database 500 may include information such as: an identifier of the CDO each asset is associated with (e.g., corresponding to the CDO identifier of FIG. 8); the associated tranche; an asset description; an issuer of the asset; other information identifying the asset (e.g., such as a CUSIP); a coupon, maturity, balance, type, status of the asset; an industry of the asset; and other information generally used by those skilled in the art to identify and analyze assets associated with CDOs. The information entered into databases (such as the databases of FIGS. 6-8) may be retrieved from a number of sources. For example, some or all of the information may be retrieved from data sources 106. As a particular example, data may be retrieved from CDO issuers or collateral managers when a CDO is established. Data may also be retrieved from commercial information sources such as the data sources provided by Intex Solutions, Inc. or the like.

Referring again to FIG. 4, processing continues at 204 where asset and issuer information stored at 202 are normalized. In some embodiments, this may require data entry or other processing to ensure that information stored at 202 are stored in a consistent manner. For example, issuers of CDOs often issue prospectus or documentation which describe the assets held in each CDO tranche. Often, this information is inconsistent. For example, two CDO issuers who issue CDOs which hold the same asset may refer to that asset differently. As a specific example, a first CDO issuer may refer to a particular corporate bond as "Global Crossing Ltd., 9.125%, Nov. 15, 2009", while a second CDO issuer may refer to the same corporate bond as "Global Crossing Holdings Limited, 9.125%, November 2009". Embodiments utilize processing (such as processing at 204) to normalize this information. For example, in some embodiments, data entered at 202 may be reviewed to ensure that asset information is entered in a consistent manner. In the example, information identifying the corporate bond in both CDOs will be updated to identify it consistently in both CDOs. In some embodiments, this is performed using a rule-based system to enforce consistent terminology (e.g., all corporate bonds issued by Global Crossings will be identified as being issued by "Global Crossing Hldg Ltd"; similarly, all corporate bonds will be referred to by their month and year of maturity).

Processing continues at 206 where the normalized CDO information is made available (e.g., the information may be provided to CDO investors including CDO investors operating user devices 104, the information may also be provided to CDO managers or other interested entities or individuals). As will be described further below, this information may be presented to investors to allow them to manage or analyze existing portfolios or to manage or analyze hypothetical portfolios.

Figure 5:
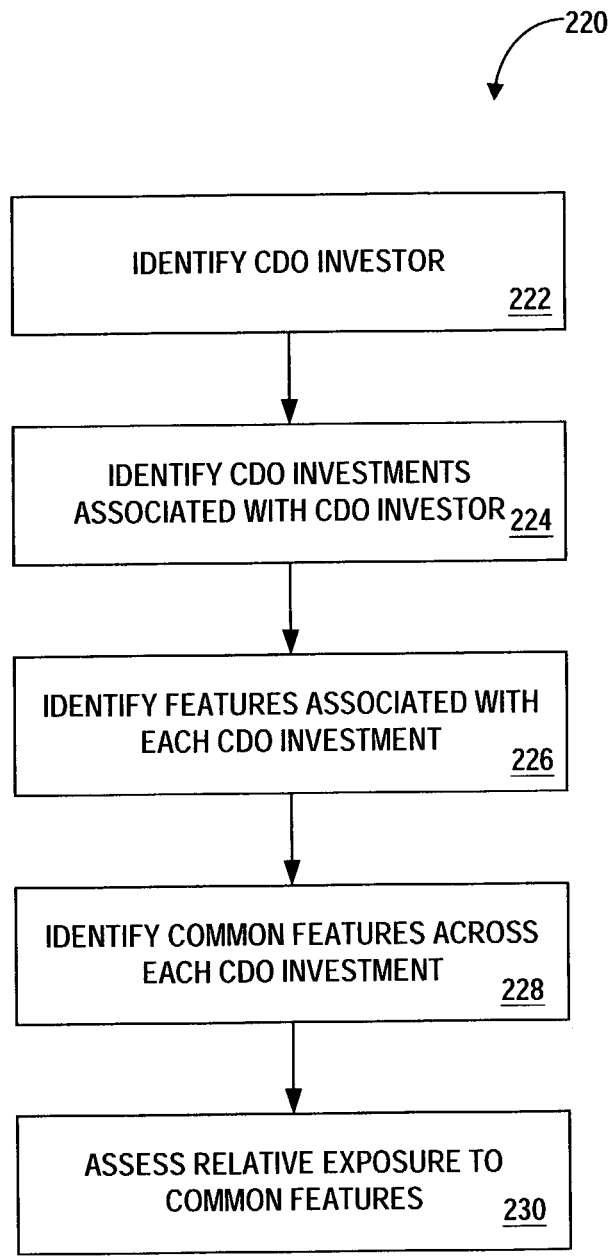
FIG. 5 is a flow diagram illustrating an exemplary process for evaluating common exposures in a CDO portfolio pursuant to some embodiments of the present invention.

Reference is now made to FIG. 5, where a process 220 is depicted for analyzing a CDO investor's current portfolio. Process 220 may also be utilized to analyze a CDO investor's hypothetical portfolio. Process 220 may involve interaction between CDO management system 102 and an investor (or an agent of an investor) operating a user device 104.

Process 220 begins at 222 where a CDO investor is identified. For example, processing at 222 may involve a CDO investor operating user device 104 to interact with CDO management system 102 to begin a session with CDO management system 102. For example, in a Web-based environment, a CDO investor may direct a Web browser of user device 104 to access a Web-site maintained by (or on behalf of) CDO management system 102. The CDO management system 102 may require the CDO investor to identify itself (e.g., using password or other security techniques to uniquely and securely identify the investor). Processing at 222 may include retrieving CDO investor information from a database, such as investor database 300 of FIG. 7.

Processing continues at 224 where CDO investments associated with the CDO investor identified at 222 are retrieved. For example, after a CDO investor is identified, information may be retrieved from database 300 (see FIG. 7) identifying those CDO deals in which the investor currently holds a position. As a specific example (referring briefly to FIG. 7), if the investor is identified as having investor identifier "I-1001", processing at 224 may include retrieving information from database 300 indicating that the CDO investor holds positions in three different CDOs (i.e., the investor's portfolio consists of holdings in "CDO-0001", "CDO-0002", and "CDO-0010", including tranches A, A, and C, respectively). In some embodiments, processing at 224 may include allowing the CDO investor to select a desired CDO investment (or investments) to add to a "hypothetical portfolio". For example, the CDO investor may be presented with a menu of available CDO investments for which data is available. The CDO investor may selectively choose one or more of these available investments to construct a hypothetical portfolio for analysis.

Processing continues at 226 where assets and data associated with each of the CDO investor's portfolio (or hypothetical portfolio) are identified. For example, this may include retrieving information from a database such as the CDO database 400 depicted in FIG. 8. In the specific example introduced above, CDO information from database 400 may be retrieved for CDO-0001 (tranche A), CDO-0002 (tranche A), and CDO-0010 (tranche C) as they were identified as being included in the CDO portfolio held by the investor identified as "I-1001". This information may be presented to the investor (e.g., on a display device of user device 104) for its review.

Processing continues at 228 where the investor operates user device 104 in conjunction with CDO management system 102 to identify common features which exist in its portfolio (or hypothetical portfolio). A number of different types of common features may be identified using embodiments of the present invention, including common assets, common issuers, common industries, etc. For example, the CDO investor may desire to identify those assets which are held in each of the CDO's in which it has an interest. As a further example, the CDO investor may desire to identify those issuers of assets which are represented in each of the CDOs in which the investor has an interest. As a still further example, the CDO investor may wish to identify those industry areas which are represented in each of the CDOs in which the investor has an interest. In this manner, the CDO investor may efficiently and quickly identify areas of potential overexposure or risk.

Processing continues at 230 where the CDO investor may utilize features of embodiments of the present invention to assess relative exposures to the identified common features. For example, the CDO investor may wish to identify how large a portion of its total CDO holdings are exposed to "WorldCom, Inc." corporate bonds. The CDO investor may also wish to identify how large a portion of its total CDO holdings are based on holdings in a particular industry. For example, the CDO investor may be particularly concerned with the stability of companies in the telecommunications industry, and may wish to quickly assess the extent of its CDO portfolio which is based on bonds or loans issued by companies in this industry. Other analyses and assessments may also be performed.

Figure 6:
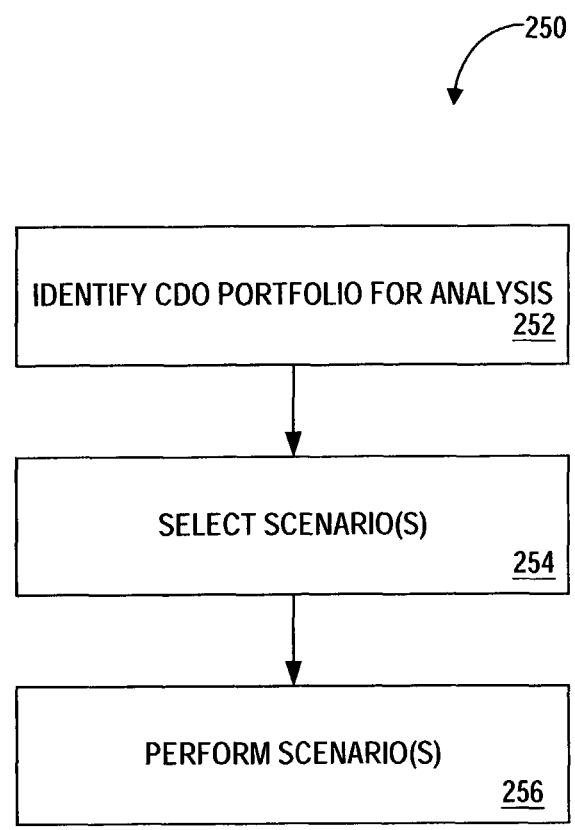
FIG. 6 is a flow diagram illustrating an exemplary process for analyzing a CDO portfolio pursuant to some embodiments of the present invention.

Reference is now made to FIG. 6, where a further flow diagram 250 is depicted which depicts a general flow for analyzing a portfolio (or a hypothetical portfolio) using features of embodiments of the present invention. Process 250 begins at 252 where a CDO investor (e.g., operating user device 104 to interact with CDO management system 102) identifies a CDO portfolio for analysis. Processing at 252 may involve simply identifying a CDO investor's current holdings (e.g., by retrieving data from investor database 300 of FIG. 7), or it may involve interaction in which the CDO investor creates a hypothetical portfolio consisting of one or more potential CDO investments and/or existing holdings of the CDO investor.

Processing continues at 254 where the CDO investor interacts with CDO management system 102 to select one or more scenarios (such as pricing or default scenarios) to be applied to the portfolio selected at 252. Embodiments of the present invention allow the selection of a number of different scenarios which may be quickly and easily applied to a selected portfolio. For example, the scenarios may apply various default assumptions to a portfolio. As a specific example, the investor may select (or create) a scenario in which all bonds and loans associated with WorldCom, Inc. go into default or are non-performing. As another example, the investor may identify a number of generic attributes of a pricing scenario, including: a default rate, a prepayment rate, a recovery rate, and recovery log timing for individual assets or for groups of assets. Assets may be grouped in various groupings, including, for example: groups of defaulted assets, groups of "CCC"-rated assets; and groups of performing assets. In some embodiments, the scenario may be further controlled to allow specification of any monthly defaults (e.g., by applying the same default rate to an outstanding asset balance every single month).

Processing continues at 256 where the selected scenario(s) are performed. For example, if the investor has constructed a scenario where all bonds and loans associated with World-Com, Inc. are in default or are non-performing, processing at 256 may include determining the overall effect of the scenario on the portfolio constructed at 252. A portfolio which includes one or more CDO investments having a large exposure to WorldCom, Inc. obligations will be negatively affected by the scenario. Performance of the scenario at 256 may result in the indication of an overall impact of the scenario on the portfolio so that the investor can anticipate, or model, potential risk scenarios. In some embodiments, processing at 256 may result in the generation of a cash flow projection for each asset in the portfolio. Other pricing variations may also be used in conjunction with embodiments of the present invention, thereby allowing investors and other users to model a variety of events and to predict various effects on cash flow and CDO portfolio performance.

In some embodiments, scenarios may be applied through user interfaces which are created to assist in the ready application of specific scenarios. For example, in some embodiments, a "scenario analyzer" tool may be utilized which allows the application of various default and prepayment scenarios to selected deals. For example, the tool may result in the generation of a number of relevant data points for each selected deal, including: average life, a principal window, various investment rates of return, final maturity information, etc. By providing a tool to implement these scenario analyses, users may easily apply the analyses in an efficient manner without undue data entry requirements.

As another example, in some embodiments, a "deal analyzer" tool may be utilized which allows users to readily perform price-yield calculations over a wide range of defaults, recovery and prepayment assumptions. Input variables may include data identifying different groupings of assets (e.g., such as all bonds or loans not in default, or all bonds or loans in default, etc.), the number of input values, pricing assumptions, etc. The output is a price-yield matrix which may provide users with information regarding their total return based on different assumptions. Other tools and structured analyses screens may also be provided to assist users in analyzing the data generated by CDO management system 102.

The normalized CDO information provided using embodiments of the present invention may be provided to users in a number of different ways and in a number of different formats. For example, in some embodiments, specific CDO information may be displayed to a user on a display device of a user device 104. In some embodiments, CDO reports may be output from CDO management system 102 to other devices or in hard-copy form for use by CDO investors or others. As particular examples, regular or periodic risk and issuer exposure reports may be generated using CDO data from CDO management system 102. In this manner, reports may be generated which allow investors to examine their underlying exposures at a glance, allowing them to quickly gauge a deal's performance based on a variety of coverage and quality tests to identify issues such as a deal's top exposures and most distressed holdings.

As an example, a risk report for a particular CDO deal may include information such as: a detailed defaulted asset list (identifying issues by balance, rating, price, and information regarding the extent of the exposure in a deal); a detailed list of issues by rating; the results of different coverage tests (and whether the deal passes or fails each test); the amount of issues in default (as well as their overall proportion in the deal); asset pricing information; top issuer information; top industry information, and other information allowing a user to quickly assess various risks associated with a particular CDO investment.

As another example, an issuer exposure report for a particular CDO deal may include information such as details regarding each issuer associated with the deal, details regarding overall industry exposures, and other information allowing an investor to quickly assess it's overall exposure to particular issuers and industries. Other types and combinations of reports may be generated on behalf of users using CDO management system 102. In some embodiments, the reports may be automatically generated on a periodic or regular basis. In some embodiments, the reports may be automatically generated once certain trigger events occur (e.g., such as when a certain number of defaults or a certain percentage of defaults occur). In some embodiments, the reports may be generated electronically in a format which is readily useable by systems of particular users (e.g., some users may utilize trading and analysis systems having a particular format).

In some embodiments, users may desire that cashflow data be generated, allowing the user to perform pricing or other analyses of its investments. For example, in some embodiments, users may be presented with the option of generating cashflow data for selected CDO investments. In some embodiments, users may be provided the option of generating the cashflow data in different formats. For example, in one embodiment, users may select between cashflow data generated in so-called "CSV" format (with commas delimiting each value), and cashflow data generated in a format compatible with trading devices manufactured by Bloomberg®. In this manner, users may generate files of cashflow data which are compatible with their trading and accounting systems, allowing the cashflow data to be readily imported into the other systems. Many CDO investors wish to maintain updated cashflow information on a regular basis (e.g., such as monthly). Embodiments allow accurate cashflow information to be easily created without the extensive manual, repetitive and error-prone processing required in previous systems. In some embodiments, the cashflow data can be generated by simply selecting an option to generate cashflows (e.g., without further data entry). Those skilled in the art, upon reading this disclosure, will appreciate that other reports, screens, and data files may be readily generated using embodiments of the present invention.

User Interface

Reference is now made to FIG. 10, where a variety of user interfaces are depicted which may be generated by CDO management system 102 and displayed, for example, on a display device of user device 104. In the embodiment depicted, a number of user interfaces are shown which are configured for display on a display device in a Web-based environment (e.g., where a user operates a user device equipped with a Web-browser which may be directed to a Web-site offering services or functions of embodiments of the present invention). Those skilled in the art will recognize that other display and interaction configurations may also be used to permit interaction between a user and CDO management system.

Figure 10A:
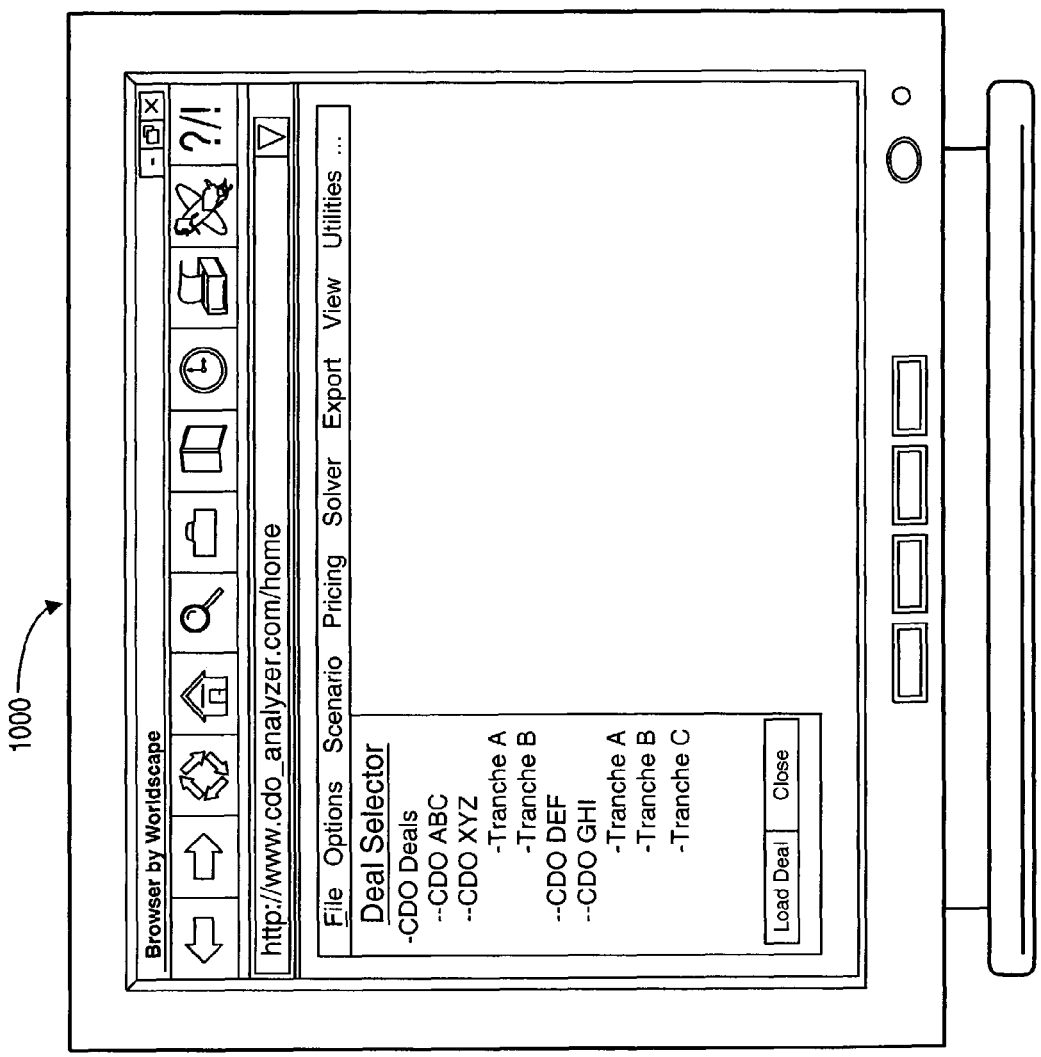
FIG. 10 depicts a number of screen shots of displays generated using some embodiments of the present invention.

Referring now to FIG. 10A, a screen 1000 is depicted which may be displayed on display device for viewing and interaction by a user such as a CDO investor or the like. The screen 1000 of FIG. 10A depicts an example of a deal selector screen which may be presented to a user after the user selects a [File] command from the top portion of the user interface. A drop down menu may be used, e.g., to present options, one of which may be the option to load a particular deal (or deals). A number of available deals may be presented (as depicted in FIG. 10A). Deals (or more particularly, in some embodiments, specific tranches of CDO deals) may be selected by identifying the deal and then the tranche of interest. In some embodiments, by selecting a particular tranche, CDO management system 102 may retrieve data regarding that tranche and present that deal in a separate tab on the display. In some embodiments, multiple deals and tranches may be selected to create a portfolio of interest.

Referring now to FIG. 10B, a further screen 1010 is depicted which may be displayed on a display device for viewing and interaction by a user. The screen 1010 of FIG. 10B depicts a main portfolio screen which displays a summary of the selected portfolio, including the selected tranches and the underlying assets which are associated with those tranches. Users may interact with a screen such as the screen of FIG. 10B to price the portfolio (e.g., by filling in the scenario section, choosing the scenario as the base case scenario, and then selecting the "Pricing" option and the "Price Deals" option).

As shown in the screen of FIG. 10B, the display area may be configured with several sections. In the embodiment depicted, the display is configured with three primary sections: a top section 1012 displaying "deal information" (or, details regarding each of the CDO tranches in a user's portfolio or hypothetical portfolio); a middle section 1014 displaying "static" information (having multiple tabs that contain some unique information about each CDO tranche in the user's portfolio or hypothetical portfolio, which information does not change despite changes in pricing or other scenarios); and a bottom section 1016 displaying "dynamic" information (having multiple tabs that contain variable data that allows a user to perform pricing and other scenarios and view their impact on their portfolio or hypothetical portfolios). Those skilled in the art will appreciate that other formats and use of screen space may be utilized to display information; the depicted embodiment is one suitable approach.

Each of the sections of the screen of FIG. 10B may provide details regarding CDO deals. For example, the top screen section 1012, specific selected deals and tranche information associated with a user's portfolio are displayed. Buttons allow a user to select or deselect individual tranches for pricing analyses. In general, in the depicted embodiment, the screen of FIG. 10B provides a user with a complete pricing summary of the user's portfolio (or hypothetical portfolio). In the depicted embodiment, the user may view the entire portfolio or individual tranches (e.g., as shown, the user has selected to view all deals associated with his portfolio, displaying deal information, pricing information, and static analysis data for each deal in the portfolio).

The middle section 1014 includes information about the selected portfolio, including information displayed by issuer, by asset, by ratings (e.g., such as Moodys and S&P), etc. Each of the screens may be sorted by different columns (e.g., the portfolio by issuer may be sorted by issuer name, by balance, or by percentage). The bottom section 1016 includes dynamic information such as the scenario data depicted. By interacting with the scenario data, a user may select the application of different pricing or analysis scenarios and view scenario data associated with those analyses. In this manner, a user can efficiently and easily evaluate and assess risks and opportunities associated with different investments.

Referring now to FIG. 10C, a further screen is depicted which shows a further embodiment of a screen display 1018 from the middle section of FIG. 10B (the section presenting static information about the user's portfolio). In particular, the screen shows information regarding the user's portfolio, sorted by issuer of assets. For example, the screen may be used to show a user the composition of his portfolio, by issuer. In the depicted example, the user's portfolio is heavily weighted in assets issued by Nextel Communications Inc. (Nextel is represented in about 25 deals associated with the user, and represents on the average 1.5% of each asset pool comprising the user's portfolio). In some embodiments, each of the issuers are identified by a name which has been normalized to ensure that each issuer is identified by a single, consistent name. In this manner, users can accurately and efficiently monitor the effect of individual issuers on their holdings. Other static information may also be presented. Each of the available screens in the static information section may be presented for the user's total portfolio (or hypothetical portfolio) or for individual tranches of the user's portfolio (or hypothetical portfolio).

Referring now to FIG. 10D, a further static information screen 1020 is shown which presents a user with information about his portfolio (or specific tranches) by individual assets. In the depicted example screen, the assets are shown listed in alphabetical order including information about the total portfolio balance based on each asset and the percentage of the total portfolio based on each asset. Each asset may be identified based on its identifier (e.g., such as its CUSIP or LIN or the like). As a result, the assets may be segmented into types (e.g., bonds vs. loans). Further segmentation may be provided between the facility or issue series. In this manner, different issues or facilities provided by a single issuer may be specifically identified for analysis and monitoring.

Referring now to FIG. 10E, a further static information screen 1022 is shown which presents a user with information about his portfolio (or specific tranches) by Moodys Investor Services® ratings and data. Similar screens may be viewed which show similar information relating to Standard & Poors® ratings and data or the like. Referring now to FIG. 10F, a further static information screen 1024 is shown which presents a user with information about his portfolio (or specific tranches) by Moodys Investor Services® in dollars. These screens may be used by a user to view the industry classification of underlying assets as well as their current credit ratings. In some embodiments, the data is retrieved on a regular basis from external data sources to ensure that the data reflects current pricing and rating data from the external sources. This screen may be used to view risk exposure to a particular industry and to view the credit spectrum of a particular industry.

Other static information may be presented. For example, the user's portfolio (or hypothetical portfolio) by issuer, by deal may be provided to show a more detailed view of the user's portfolio by issuer (e.g., providing an aggregated exposure to a single issuer as well as the deals that have exposure to that issuer). This allows a user to quickly and accurately view a summary of deals which are most heavily exposed to a single name default risk. Other static information may include data identifying portfolio overlaps. For example, this information may be used to determine how similar different portfolios are (e.g., to identify whether two portfolios have high correlations which may result in an unreasonably high risk of default that could adversely effect multiple portfolios).

As mentioned in conjunction with FIG. 10B, "dynamic" information may also be presented in a third portion of a display presented to users. FIGS. 10H-10L depict various screens displaying dynamic information generated and presented pursuant to some embodiments. Referring first to the bottom section 1016 of FIG. 10B, a dynamic data screen is depicted which shows a variety of options available to a user, allowing the user to select various scenarios to be applied to the user's portfolio, hypothetical portfolio, or individual tranches. For example, a user may perform complex issuer-level default probability scenarios and apply the scenarios to every other asset within the user's portfolio, hypothetical portfolio or tranches. For example, if an investor becomes aware that a particular issuer (e.g., such as Polaroid Corp.) has just declared bankruptcy, the investor may utilize features of embodiments of the present invention to quickly assess the overall impact of the bankruptcy on the investor's CDO portfolio. This may be performed by selecting Polaroid Corp. in the "issuer level" screens for application of a scenario, specify the default rate and recovery rate assumptions for Polaroid Corp., and run the scenario. Embodiments of the present invention allow such a scenario to be applied to all CDO investments which include Polaroid Corp. as an issuer.

The dynamic screen section 1016 depicted in FIG. 10B allows a user to quickly and consistently apply a wide variety of pricing scenarios. For example, three separate groups control the cash flow projection of CDO assets: a group of assets that are currently in default, a group of assets that are currently rated Caa3 or below, and the group of remaining assets. Within these groups, assets are further divided into bonds and loans. These groups may then be controlled using, for example, four parameters: default rate assumption; recovery rate assumption; recovery lag assumption; and prepayment rate assumption. Embodiments allow users to quickly modify, define, and apply these various parameters. For example, a user may be provided with options to control pricing of a deal to the first par-call date, to default any "non-monthly" assets on a monthly basis, etc. The screen of FIG. 10B depicts one embodiment for allowing user interaction in pricing scenarios.

As depicted in FIG. 10H, a screen 1028 displays asset level dynamic. As shown, the user is displayed information including a list of all assets that are underlying a selected deal or tranche. Check boxes are provided to override scenarios or to force cash flow projections. In one embodiment, if no assets are selected, each asset in the tranche or deal will be analyzed for its own cash flow projection using the currently selected scenario. If the scenario is overridden for a particular asset (or assets), those selected assets may be analyzed using a custom cash flow projection. In some embodiments, the user may apply scenarios which control every asset's default rate, recovery rate, prepayment rate, and recovery lag timing. Further, the user may specify a vector rather than use of a single number (e.g., the user may efficiently create and apply scenarios by creating a custom default vector).

Reference is now made to the screen of FIG. 10I, where a test scores screen 1030 is depicted which may be presented in the dynamic information area of a user display device. As depicted, this screen includes the results of various coverage tests and quality tests that have been performed on a particular tranche for the current month. For example, this screen may present information such as: the par value tests, interest rate coverage tests, diversity score tests and rating factors tests. Further, the screen may present current test scores as calculated by a trustee of the tranche, the required threshold and the result of the test. Information supporting this screen may be retrieved on a regular basis from various data sources.

Reference is now made to FIG. 10J, where a reinvestment screen 1032 is shown (which may be presented in the dynamic information section of the display). In some embodiments, CDO management system 102 may be configured to automatically assume that any unscheduled cash flows will be reinvested during reinvestment periods. However, in some embodiments, users may specify particular reinvestment scenarios. For example, a user may select a combination of bond and loans from a deal both in percentage allocation between the two as well as the purchase price paid for those asset categories. Further, hypothetical pricing scenarios may also be performed to predict future reinvestment options.

Reference is now made to FIG. 10K, where a test results screen 1034 is shown (which may be presented in the dynamic information section of the display). For example, the screen may display the results of all coverage tests and some quality tests that are calculated during the cash flow analysis. The most recently run cash flow scenario is used to determine the results of these tests. Reference is now made to FIG. 10L, where a tranche cash flow screen 1036 is depicted which shows the results of the latest scenario run. All tranches selected on the main screen may be presented with their own tabs in some embodiments. In some embodiments, a user may be provided with the option to show only the payment months cash flows. In some embodiments, the user may be provided with the option to show all monthly cash flows. Similar screens may be provided to display asset cash flow information.

Other screens may also be provided to assist a user in performing other functions and/or to present data in a useful format. For example, other pricing screens may be provided to interface with or utilize pricing tools such as the pricing tools provided by Moodys Investors Services (e.g., such as tools using Moody's "Binomial Expansion Technique" analysis which is used to rate new issue deals with their appropriate risk rating). Embodiments allow the application of a variety of pricing and analysis tools to portfolios even after the CDO has been issued, allowing an investor to monitor whether deals can hold their rating if, for example, a particular tranche were to be re-rated in the secondary market after some aging. In this manner, investors can continually monitor the performance of their portfolios (and analyze the performance of hypothetical portfolios) based on a number of pricing and analysis techniques. Other screens may be presented to allow users to generate the reports or other outputs discussed above.

Each of the display screens described above are presented for the purposes of illustration only; those skilled in the art will appreciate that other screen configurations and formats may also be utilized in conjunction with embodiments of the present invention. Although the present invention, has been described with respect to a preferred embodiment thereof, those skilled in the art will note that various substitutions may be made to those embodiments described herein without departing from the spirit and scope of the present invention.

What is claimed is:

1. A processor-implemented method for managing investments, comprising:
   identifying by a processor a first investment including interests in a first plurality of assets;
   identifying a second investment including interests in a second plurality of assets;
   identifying a common issuer of assets associated with both said first and second plurality of assets;

identifying a relative exposure to risk associated with said common issuer;

modeling by the processor a default associated with said common issuer involving a default rate, a recovery rate, and a custom default vector;

calculating by the processor an impact on said first and said second investments based on said default;

generating by the processor a risk and issuer exposure report based on said calculated impact on said default; and adjusting by the processor asset holdings in the first investment and the second investment based on the calculated impact to lessen exposure, wherein said first and second investments are collateralized debt obligation (CDO) investments.

2. The method of claim 1, wherein said common asset is at least one of a debt security and a corporate loan.

3. The method of claim 1, wherein each of said first and second plurality of assets are identified by at least one of a CUSIP number and an asset descriptor.

4. The method of claim 3, wherein each asset descriptor is normalized to substantially provide standardized asset descriptions for each of said first and second plurality of assets.

5. A processor-implemented method for monitoring collaterized debt obligation (CDO) investments, comprising:

receiving information identifying an investor and a first CDO investment and a second CDO investment held by the investor;

identifying by a processor a first plurality of assets associated with said first CDO investment;

identifying a second plurality of assets associated with said second CDO investment;

identifying each of said first and second plurality of assets using a standardized asset description;

identifying a common asset associated with said first and second CDO investments;

modeling by the processor a default associated with said common asset involving a default rate, a recovery rate, and a custom default vector;

calculating by the processor an impact on said first and said second CDO investments based on said default;

generating by the processor a report including the identified common asset and the calculated impact on said first and said second CDO investments; and adjusting by the processor asset holdings in the first CDO investment and the second CDO investment based on the calculated impact to lessen exposure.

6. A processor-implemented method of monitoring collaterized debt obligation (CDO) investments, comprising:

receiving by a processor information identifying an investor and a CDO investment held by the investor;

identifying a first plurality of assets associated with said CDO investment;

receiving information identifying a desired CDO investment, including a second plurality of assets associated with said desired CDO investment;

identifying a common asset associated with said desired CDO investment and said CDO investment;

modeling by the processor a default associated with said common asset involving a default rate, a recovery rate, and a custom default vector;

calculating by the processor an impact on said CDO investment and said desired CDO investment based on said default;

generating by the processor a report including the identified common asset and the calculated impact on the desired CDO investment and the CDO investment; and adjusting by the processor asset holdings in the CDO investment and the desired CDO investment based on the calculated impact to lessen exposure.

7. The method of claim 6, further comprising:

assessing an overall exposure associated with said desired CDO investment and said CDO investment attributed to said common asset.

8. A processor-implemented method for monitoring a collaterized debt obligation (CDO) portfolio, comprising:

entering by a processor information identifying a first CDO and a second CDO investment, the first CDO investment including interests in a first plurality of assets, the second CDO investment including interests in a second plurality of assets;

entering pricing assumption data, said price assumption data including a default rate, a recovery rate, and custom default vector;

modeling by the processor an impact on said first and second CDO investments based on said pricing assumption data;

calculating by the processor an impact on said first and said second CDO investments based on said default;

generating by the processor a risk and issuer exposure report based on said calculated impact on said default; and adjusting by the processor asset holdings in the first CDO investment and the second CDO investment based on the modeled impact to lessen exposure.

9. The method of claim 8, wherein said pricing assumption data includes data identifying at least one of: a recovery lag assumption and a prepayment rate assumption.

10. The method of claim 8, further comprising:

selecting an asset group, wherein said pricing assumption data operates on said selected asset group.

11. The method of claim 10, wherein said asset group is selected based on at least one of:

a group of assets in said first and second CDO investments that are currently in default;

a group of assets in said first and second CDO investments that are below a selected rating; and a group of assets in said first and second CDO investments that are not in default and that are greater than said selected rating.

12. An apparatus for managing investments, comprising:

a processor;

a communications device, in communication with said processor, receiving data; and a memory unit in communication with the processor and storing a program, wherein the processor is operative with the program to:

identify a first investment including interests in a first plurality of assets;

identify a second investment including interests in a second plurality of assets;

identify a common issuer of assets associated with both said first and second plurality of assets;

identify a relative exposure to risk associated with said common issuer;

model a default associated with said common issuer involving a default rate, a recovery rate, and a custom default vector;

calculate an impact on said first and said second investments based on said default;

generate a risk and issuer exposure report based on said calculated impact on said default; and adjust asset holdings in the first investment and the second investment based on the calculated impact to lessen exposure, wherein said first and second investments are collateralized debt obligation (CDO) investments.

13. A non-transitory, computer-readable medium storing computer-issuable instructions to:

identify a first investment including interests in a first plurality of assets;

identify a second investment including interests in a second plurality of assets;

identify a common issuer of assets associated with both said first and second plurality of assets; and identify a relative exposure to risk associated with said common issuer;

model a default associated with said common issuer involving a default rate, a recovery rate, and a custom default vector;

calculate an impact on said first and said second investments based on said default;

generate a risk and issuer exposure report based on said calculated impact on said default; and adjust asset holdings in the first investment and the second investment based on the calculated impact to lessen exposure, wherein said first and second investments are collateralized debt obligation (CDO) investments.

14. An apparatus, comprising:

a memory;

a processor disposed in communication with said memory, and configured to execute a plurality of processing instructions stored in the memory, wherein the processor executes instructions to:

identify a first investment including interests in a first plurality of assets;

identify a second investment including interests in a second plurality of assets;

identify a common issuer of assets associated with both said first and second plurality of assets;

identify a relative exposure to risk associated with said common issuer;

model a default associated with said common issuer involving a default rate, a recovery rate, and a custom default vector;

calculate an impact on said first and said second investments based on said default; and generate a risk and issuer exposure report based on said calculated impact on said default; and adjust asset holdings in the first investment and the second investment based on the calculated impact to lessen exposure, wherein said first and second investments are collateralized debt obligation (CDO) investments.

* * * * *